(12) United States Patent
Chung et al.

(10) Patent No.: US 10,735,634 B2
(45) Date of Patent: Aug. 4, 2020

(54) IMAGE CAPTURE APPARATUS

(71) Applicant: Gingy Technology Inc., Hsinchu (TW)

(72) Inventors: Wei-Chun Chung, Hsinchu (TW);
Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 30 days.

(21) Appl. No.: 16/008,056

(22) Filed: Jun. 14, 2018

(65) Prior Publication Data
US 2019/0387141 A1    Dec. 19, 2019

(51) Int. Cl.
| | |
|---|---|
| *H04N 5/225* | (2006.01) |
| *H04N 9/31* | (2006.01) |
| *G02B 5/22* | (2006.01) |
| *G02B 5/26* | (2006.01) |
| *G06K 9/00* | (2006.01) |

(52) U.S. Cl.
CPC .......... *H04N 5/2254* (2013.01); *G02B 5/22* (2013.01); *G02B 5/265* (2013.01); *G06K 9/00013* (2013.01); *G06K 9/00046* (2013.01); *H04N 9/3176* (2013.01)

(58) Field of Classification Search
CPC .......... H04N 5/2254; G06K 9/00013; G06K 9/00046; G02B 5/22; G02B 5/223; G02B 5/226; G02B 5/26; G02B 5/265
See application file for complete search history.

(56) References Cited

U.S. PATENT DOCUMENTS

| | | | |
|---|---|---|---|
| 5,177,802 A | 1/1993 | Fujimoto et al. | |
| 9,818,017 B2 | 11/2017 | Wu | |
| 9,829,614 B2 | 11/2017 | Smith et al. | |
| 9,964,436 B1 | 5/2018 | Chung et al. | |
| 10,181,070 B2 * | 1/2019 | Smith | G02B 5/005 |
| 10,460,188 B2 * | 10/2019 | Wu | G06K 9/0004 |
| 2016/0132712 A1 | 5/2016 | Yang et al. | |

(Continued)

FOREIGN PATENT DOCUMENTS

| | | |
|---|---|---|
| CN | 104849870 | 8/2015 |
| EP | 1835277 | 9/2007 |

(Continued)

OTHER PUBLICATIONS

"Office Action of Taiwan Counterpart Application," dated Jun. 11, 2019, p. 1-p. 10.

*Primary Examiner* — Daniel M Pasiewicz
(74) *Attorney, Agent, or Firm* — JCIPRNET (57) ABSTRACT

An image capture apparatus includes an image capture element and a spatial filter. The spatial filter is disposed on the image capture element. The spatial filter includes a plurality of translucent substrates and a plurality of light shielding structures. The plurality of light shielding structures and the plurality of translucent substrates are alternately arranged along a first direction. Each of the light shielding structures at least includes a light absorbing layer, and the light absorbing layer has a plurality of first openings respectively corresponding to the pixel regions. At least one of the plurality of light shielding structures includes a reflective layer and a light absorbing layer stacked to each other. The reflective layer has a plurality of second openings respectively overlapped with the plurality of first openings of the light absorbing layer of the at least one of the plurality of light shielding structures.

10 Claims, 9 Drawing Sheets

(56) References Cited

U.S. PATENT DOCUMENTS

| | | |
|---|---|---|
| 2016/0224816 A1 | 8/2016 | Smith et al. |
| 2018/0081098 A1 | 3/2018 | Smith et al. |
| 2018/0120149 A1 | 5/2018 | Chung et al. |
| 2018/0157889 A1 | 6/2018 | MacDonald et al. |

FOREIGN PATENT DOCUMENTS

| | | |
|---|---|---|
| JP | 2003141514 | 5/2003 |
| JP | 2010094499 | 4/2010 |
| TW | 201032146 | 9/2010 |
| TW | 201310299 | 3/2013 |
| TW | I545335 | 8/2016 |

* cited by examiner

IMAGE CAPTURE APPARATUS

BACKGROUND OF THE INVENTION

Field of the Invention

The invention relates to an optical apparatus, and particularly relates to an image capture apparatus.

Description of Related Art

Currently, an optical fingerprint identification apparatus achieves fingerprint image capturing based on the principle of total reflection. The operating principle thereof is as follows: when a finger presses a fingerprint identification apparatus, the convex portion of the fingerprint destroys the total reflection of a light beam in the light transmitting element, and the concave portion of the fingerprint does not destroy the total reflection of the light beam in the light transmitting element. Consequently, the image capture element may obtain the bright stripes of the concave portion of the fingerprint and the dark stripes of the convex portion of the fingerprint. In this way, each pixel region on the image capture element may capture the stripe patterns corresponding to each area of the fingerprint so as to identify the user's identity.

To improve the accuracy of the image capture apparatus, it is necessary to further improve the filtering capabilities of the spatial filter on the image capture apparatus. However, the spatial filter based on current prior art techniques still has a lot of defects in terms of filtering capabilities. For example, it is not easy to make the light beam reflected by the fingerprint enter the corresponding pixel region accurately. As a result, image capturing capabilities of the image capture apparatus cannot be improved, causing problems such as a decrease in fingerprint identification capabilities.

SUMMARY OF THE INVENTION

The invention provides an image capture apparatus of good image capturing quality.

The image capture apparatus of the invention includes an image capture element and a spatial filter. The image capture element has a plurality of pixel regions. The spatial filter is disposed on the image capture element, wherein the spatial filter includes a plurality of translucent substrates and a plurality of light shielding structures. The plurality of light shielding structures and the plurality of translucent substrates are alternately arranged along a first direction, wherein each of the light shielding structures at least includes a light absorbing layer, and the light absorbing layer has a plurality of first openings respectively corresponding to the pixel regions. At least one of the plurality of light shielding structures includes a reflective layer and a light absorbing layer stacked to each other. The reflective layer has a plurality of second openings respectively overlapped with the plurality of first openings of the light absorbing layer of the at least one of the plurality of light shielding structures. Each of the second openings of the reflective layer has a width W2 in a second direction. Each of the first openings of the light absorbing layer has a width W1 in the second direction.

The invention provides a detection apparatus including an image capture element, a spatial filter and a surface plasma resonance layer. The image capture element has a plurality of pixel regions. The spatial filter is disposed on the image capture element, wherein the spatial filter includes a plurality of translucent substrates and a plurality of light shielding structures. The plurality of light shielding structures and the plurality of translucent substrates are alternately arranged along a first direction, wherein each of the light shielding structures at least includes a light absorbing layer, and the light absorbing layer has a plurality of first openings respectively corresponding to the pixel regions. At least one of the plurality of light shielding structures includes a reflective layer and a light absorbing layer stacked to each other. The reflective layer has a plurality of second openings respectively overlapped with the plurality of first openings of the light absorbing layer of the at least one of the plurality of light shielding structures. Each of the second openings of the reflective layer has a width W2 in a second direction. Each of the first openings of the light absorbing layer has a width W1 in the second direction. The spatial filter is located between the surface plasma resonance layer and the image capture element, and the surface plasma resonance layer is adapted to receive a biopolymer.

In an embodiment of the invention, the width W1 of each of the plurality of first openings and the width W2 of each of the plurality of second openings satisfy $W2 \leq W1$.

In an embodiment of the invention, the width W1 of each of the plurality of first openings and the width W2 of each of the plurality of second openings satisfy $0.2W1 \leq W2 \leq 0.8W1$.

In an embodiment of the invention, a sum of a thickness of the light absorbing layer and a thickness of the reflective layer is less than a thickness of the translucent substrate.

In an embodiment of the invention, each of the plurality of light shielding structures has the reflective layer and the light absorbing layer stacked to each other.

In an embodiment of the invention, the plurality of light shielding structures include a first light shielding structure and a second light shielding structure, the first light shielding structure includes the reflective layer and the light absorbing layer stacked to each other, and the second light shielding structure includes a light absorbing layer and does not include the reflective layer.

In an embodiment of the invention, the first light shielding structure is closer to the image capture element than the second light shielding structure is.

In an embodiment of the invention, the first light shielding structure is farther away from the image capture element than the second light shielding structure is.

In an embodiment of the invention, the image capture apparatus further includes a cover plate having a pressing surface adapted to be pressed by a finger, wherein the spatial filter is located between the cover plate and the image capture element.

In an embodiment of the invention, the image capture apparatus further includes a display panel, wherein the spatial filter is located between the display panel and the image capture element.

In an embodiment of the invention, the image capture apparatus further includes a filter layer located on the image capture element.

Based on the foregoing, in the image capture apparatus according to an embodiment of the invention, since the light shielding structure has the reflective layer and the light absorbing layer stacked to each other, and since the plurality of first openings of the reflective layer and the plurality of second openings of the light absorbing layer are overlapped with each other to form the plurality of openings of the light shielding structure, when the light beam is reflected by the finger and proceeds toward the plurality of openings, the light beam may be more accurately restricted to be transmitted to the corresponding pixel region on the image capture element so as to achieve good image capturing quality. Besides, due to the configuration of the light absorbing layer, a portion of the light beam may be immediately absorbed by the light absorbing layer after being reflected by the reflective layer, thereby greatly reducing the possibility that the light beam may be transmitted to the adjacent opening. Consequently, the cross-talk problem between each pixel region is reduced, and the accuracy of the image capture apparatus is improved. In the detection apparatus according to another embodiment of the invention, since the surface plasma resonance layer is further provided, the detection apparatus has the dual function of serving the function of fingerprint identification and detecting biometric features of the biopolymers, thereby improving the practicality of the apparatus.

To make the aforementioned and other features and advantages of the invention more comprehensible, several embodiments accompanied with drawings are described in detail as follows.

DESCRIPTION OF THE EMBODIMENTS

Descriptions of the invention are given with reference to the exemplary embodiments illustrated by the drawings. Wherever possible, the same reference numerals are used in the drawings and the description to refer to the same or similar parts.

Figure 1:
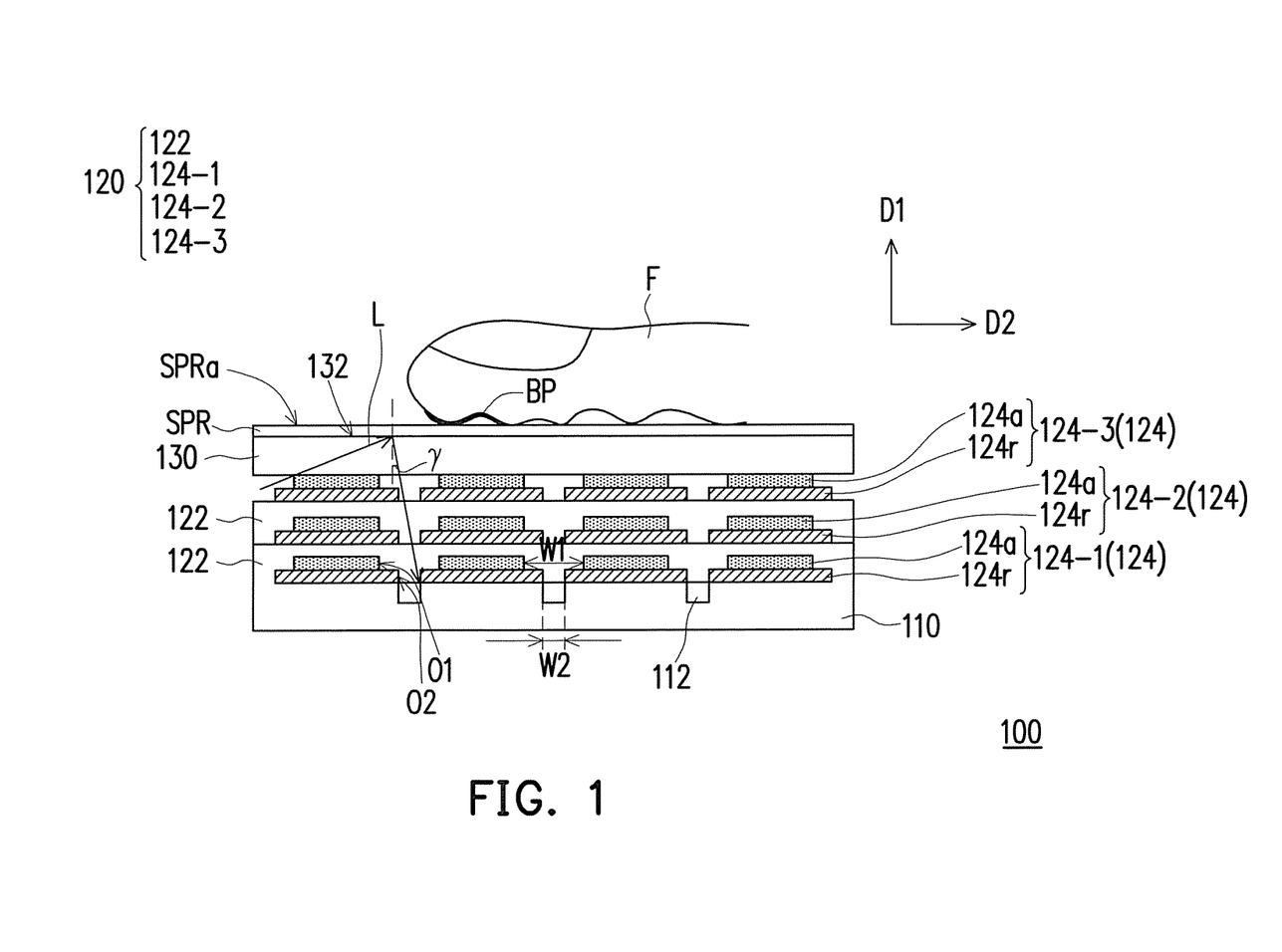
FIG. 1 is a schematic cross-sectional view of an image capture apparatus according to an embodiment of the invention.

FIG. 1 is a schematic cross-sectional view of an image capture apparatus according to an embodiment of the invention. With reference to FIG. 1, an image capture apparatus 100 includes an image capture element 110 and a spatial filter 120. The image capture element 110 has a plurality of pixel regions 112. In this embodiment, the image capture element 110 may be a photoelectric transducer, such as a charge-coupled device (CCD) or a complementary metal-oxide-semiconductor (CMOS) sensor. However, the invention is not limited thereto.

The spatial filter 120 is disposed on the image capture element 110. The spatial filter 120 includes a plurality of translucent substrates 122 and a plurality of light shielding structures 124. The plurality of light shielding structures 124 and the plurality of translucent substrates 122 are alternately arranged along a first direction D1. For example, in this embodiment, the translucent substrate 122 may be a transparent substrate, e.g., a glass substrate, a plastic substrate, or a combination thereof. However, the invention is not limited thereto. In other embodiments, the translucent substrate 122 may also be a deposited light transmitting film.

Figure 2:
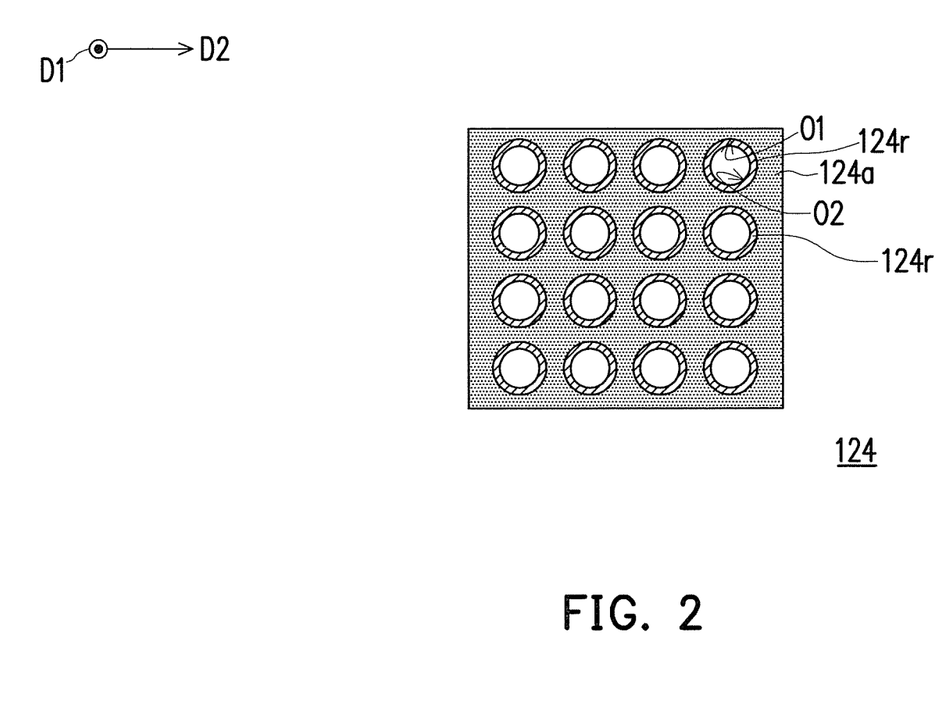
FIG. 2 is a schematic top view of a light shielding structure of an image capture apparatus according to an embodiment of the invention.

FIG. 2 is a schematic top view of a light shielding structure of an image capture apparatus according to an embodiment of the invention. With reference to FIG. 1 and FIG. 2, each of the light shielding structures 124 at least includes a light absorbing layer 124a, and the light absorbing layer 124a has a plurality of first openings O1 respectively corresponding to the plurality of pixel regions 112. At least one light shielding structure 124 of the plurality of light shielding structures 124 includes a reflective layer 124r and a light absorbing layer 124a stacked to each other. For example, in this embodiment, a plurality of light shielding structures 124-1, 124-2 and 124-3 are sequentially disposed along a direction away from the image capture element 110 (e.g., the first direction D1). Each of the light shielding structures 124-1, 124-2 and 124-3 may have the reflective layer 124r and the light absorbing layer 124a. However, the invention is not limited thereto. In this embodiment, a material of the reflective layer 124r may be a metal material or other materials with high reflectivity or a combination thereof, and a material of the light absorbing layer 124a may be a light absorbing material with low reflectivity, e.g., dark ink or other suitable materials.

The reflective layer 124r of the at least one light shielding structure 124 has a plurality of second openings O2 respectively corresponding to the plurality of pixel regions 112, and the light absorbing layer 124a of the at least one light shielding structure 124 has a plurality of first openings O1 respectively overlapped with the plurality of second openings O2. The second opening O2 of the reflective layer 124r has a width W2 in a second direction D2, the first opening O1 of the light absorbing layer 124a has a width W1 in the second direction D2, and W2<W1. For example, $0.2W1 \leq W2 \leq 0.8W1$. However, the invention is not limited thereto.

In this embodiment, the plurality of first openings O1 and the plurality of second openings O2 of the plurality of light shielding structures 124 form a plurality of light channels, and an extending direction of the plurality of light channels may be parallel to a normal direction (e.g., the first direction D1) of a pressing surface 132 of a cover plate 130. However, the invention is not limited thereto. In other embodiments, the plurality of light channels of the plurality of light shielding structures 124 may also extend in an oblique direction, and reference may be made to recitations of the R.O.C. Patent Application No. 107202731. In addition, in this embodiment, the widths W2 of the plurality of second openings O2 of the plurality of light shielding structures 124 are consistent. However, the invention is not limited thereto. In other embodiments, the widths W2 of the plurality of second openings O2 of the plurality of reflective layers 124r of the plurality of light shielding structures 124 corresponding to the same pixel region 112 may also decrease or increase progressively away from the image capture element 110, and reference may be made to recitations of the R.O.C. Patent Application No. 106142487.

A reflective material layer (not shown) may be patterned to form the reflective layer 124r having the plurality of second openings O2. A light absorbing material layer (not shown) may be patterned to form the light absorbing layer 124a having the plurality of second openings O2. The following is worth noting here: generally speaking, due to characteristics of the reflective material, it is easy to form the second opening O2 having a small width and/or a high distribution density in the reflective material layer; due to characteristics of the light absorbing material, it is not easy to form the first opening O1 having a small width and/or high distribution density in the light absorbing material layer compared to the case of the reflective material layer. In this embodiment, since the at least one light shielding structure 124 of the spatial filter 120 includes the reflective layer 124r, and since the reflective layer 124r has the second opening O2 having a small width W2 and/or a high distribution density, the light channel of the spatial filter 120 has a small minimum width (e.g., W2) and/or a high distribution density. As a result, the spatial filter 120 has a good spatial filtering capability, thereby improving the image capturing resolution of the image capture apparatus 100.

Figure 3:
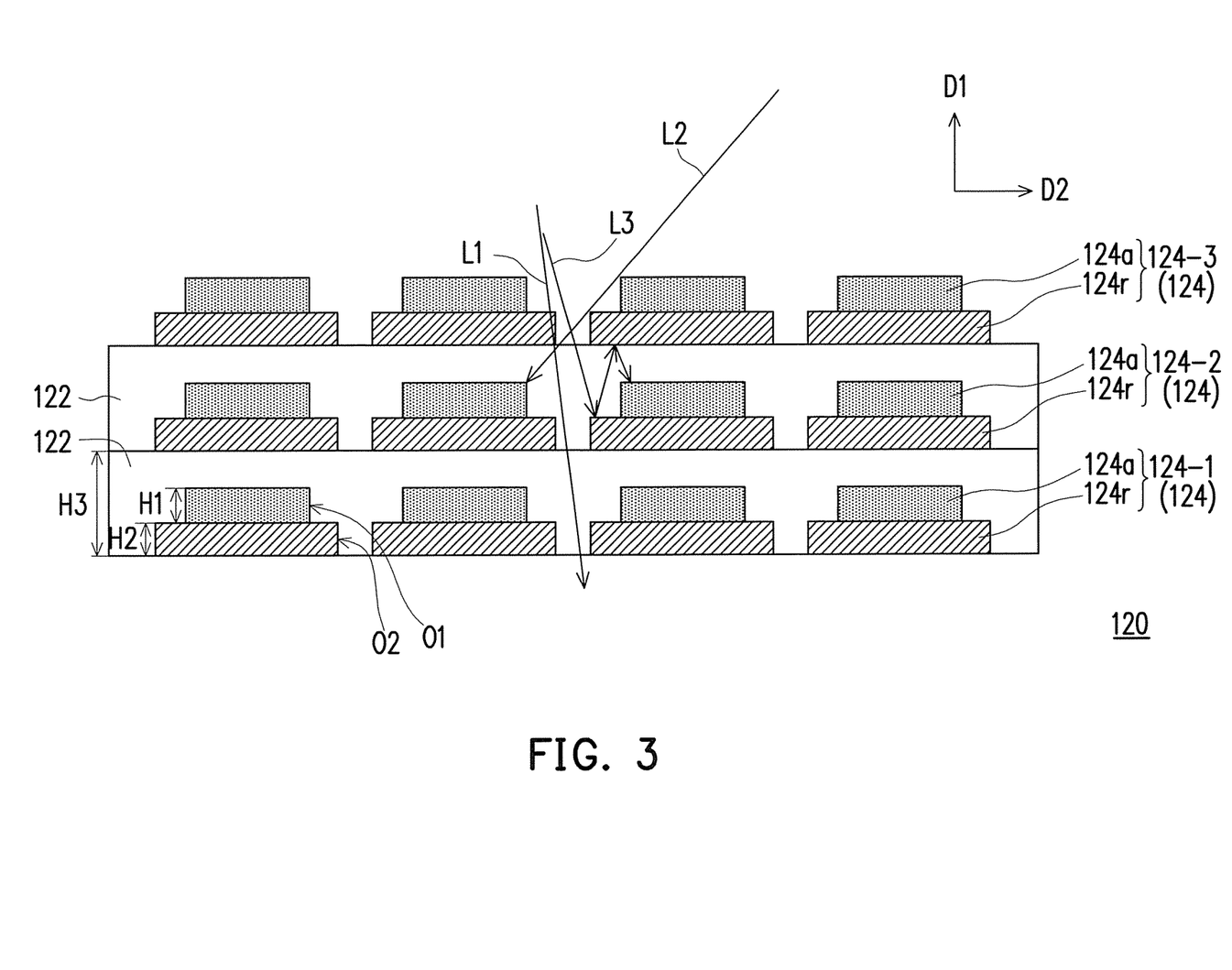
FIG. 3 is an enlarged schematic view of the spatial filter 120 in the image capture apparatus 100 of FIG. 1.

FIG. 3 is an enlarged schematic view of the spatial filter 120 in the image capture apparatus 100 of FIG. 1. With reference to FIG. 1 and FIG. 3, light beams L1, L2 and L3 diffused by a portion of a biometric feature (e.g., a fingerprint of a finger F) are transmitted to the spatial filter 120 at various incident angles. The light beam L1 may pass through the light channel of the spatial filter 120 to be transmitted to the pixel region 112 corresponding thereto of the image capture element 120 so as to form a clear biometric image. The light beam L2 may be directly transmitted to the light absorbing layer 124a of the spatial filter 120 to be absorbed by the light absorbing layer 124a. The light beam L2 would not easily stray into the pixel region 112 not corresponding thereto to cause a cross-talk problem. Although the light beam L3 is reflected by the reflective layer 124r of the light shielding structure 124-2 toward the reflective layer 124r of another light shielding structure 124-3, the light beam L3, after being reflected by the reflective layer 124r of the light shielding structure 124-3, is then absorbed by the light absorbing layer 124a of the light shielding structure 124-2. The light beam L3 would not easily stray into the pixel region 112 not corresponding thereto to cause a cross-talk problem. Therefore, by using the at least one light shielding structure 124 that has the reflective layer 124r and the light absorbing layer 124a, the spatial filter 120 not only may improve the image capturing resolution of the image capture apparatus 100, but does not easily cause a cross-talk problem.

In this embodiment, the sum of a thickness H1 of the light absorbing layer 124a and a thickness H2 of the reflective layer 124r is less than a thickness H3 of the translucent substrate 122. For example, with reference to FIG. 3, the sum of the thickness H1 of the light absorbing layer 124a of the light shielding structure 124-1 and the thickness H2 of the reflective layer 124r of the light shielding structure 124-1 is less than the thickness H3 of the translucent substrate 122 covering the light absorbing layer 124a and the reflective layer 124r of the light shielding structure 124-1. The thickness relationship of the light shielding structures 124-2 and 124-3 with the translucent substrate 122 may be deduced by analogy, and detailed descriptions are not repeated hereinafter.

With reference to FIG. 1, in this embodiment, the image capture apparatus 100 may further selectively include the cover plate 130 that has the pressing surface 132 to be pressed by the finger F, wherein the spatial filter 120 is located between the cover plate 130 and the image capture element 110.

With reference to FIG. 1, in this embodiment, the image capture apparatus 100 may further selectively include a surface plasma resonance layer SPR, wherein the spatial filter 120 is located between the surface plasma resonance layer SPR and the image capture element 110. For example, in this embodiment, the surface plasma resonance layer SPR may be disposed on the pressing surface 132 of the cover plate 130. However, the invention is not limited thereto. The surface plasma resonance layer SPR is adapted to receive biopolymers BP. The biopolymers BP may be sweat, saliva, blood, urine, bacteria, viruses, or other biopolymers to be tested. In this embodiment, the image capture apparatus 100 provided with the surface plasma resonance layer SPR may also be referred to as a detection apparatus. The detection apparatus may have the dual function of sensing fingerprint features on the finger F and detecting biometric features of the biopolymers BP simultaneously.

When a light beam L is transmitted to the surface plasma resonance layer SPR, total internal reflection (TIR) of the light beam L occurs on a surface SPRa of the surface plasma resonance layer SPR, and an evanescent wave is formed in an optically thinner medium (such as an environmental medium) and a surface plasma wave is formed in an optically denser medium (such as the surface plasma resonance layer SPR). At this point, the encounter between the evanescent wave and the surface plasma wave results in resonance. When the resonance occurs between the evanescent wave and the surface plasma wave, most of the energy of the light beam L incident on the surface plasma resonance layer SPR is absorbed by the surface plasma wave. As a result, the intensity of the light beam L reflected by the surface plasma resonance layer SPR and having a specific reflection angle is greatly reduced, and here the specific reflection angle is referred to as a resonant angle γ. In this embodiment, the resonant angle γ is related to the refractive index variation of the surface SPRa of the surface plasma resonance layer SPR, that is, the resonant angle γ is related to the properties (such as the dielectric constant) of the biopolymers BP attached to the surface SPRa of the surface plasma resonance layer SPR. By analyzing the distribution of the reflected light beam L formed on the image capture element 110, it is possible to infer the resonant angle γ so as to further infer what type of the biopolymers BP is attached to the surface SPRa of the surface plasma resonance layer SPR and whether it is the type of the biopolymers to be detected. In addition, in this embodiment, the surface SPRa of the surface plasma resonance layer SPR may selectively be a surface modification layer, so that the biopolymers BP may be attached onto the surface plasma resonance layer SPR more easily, thereby improving detection sensitivity. By the configuration of the surface plasma resonance layer SPR, the image capture apparatus 100 serves multiple functions, not only having the biometric function but also having the function of detecting the biopolymers BP.

Figure 4:
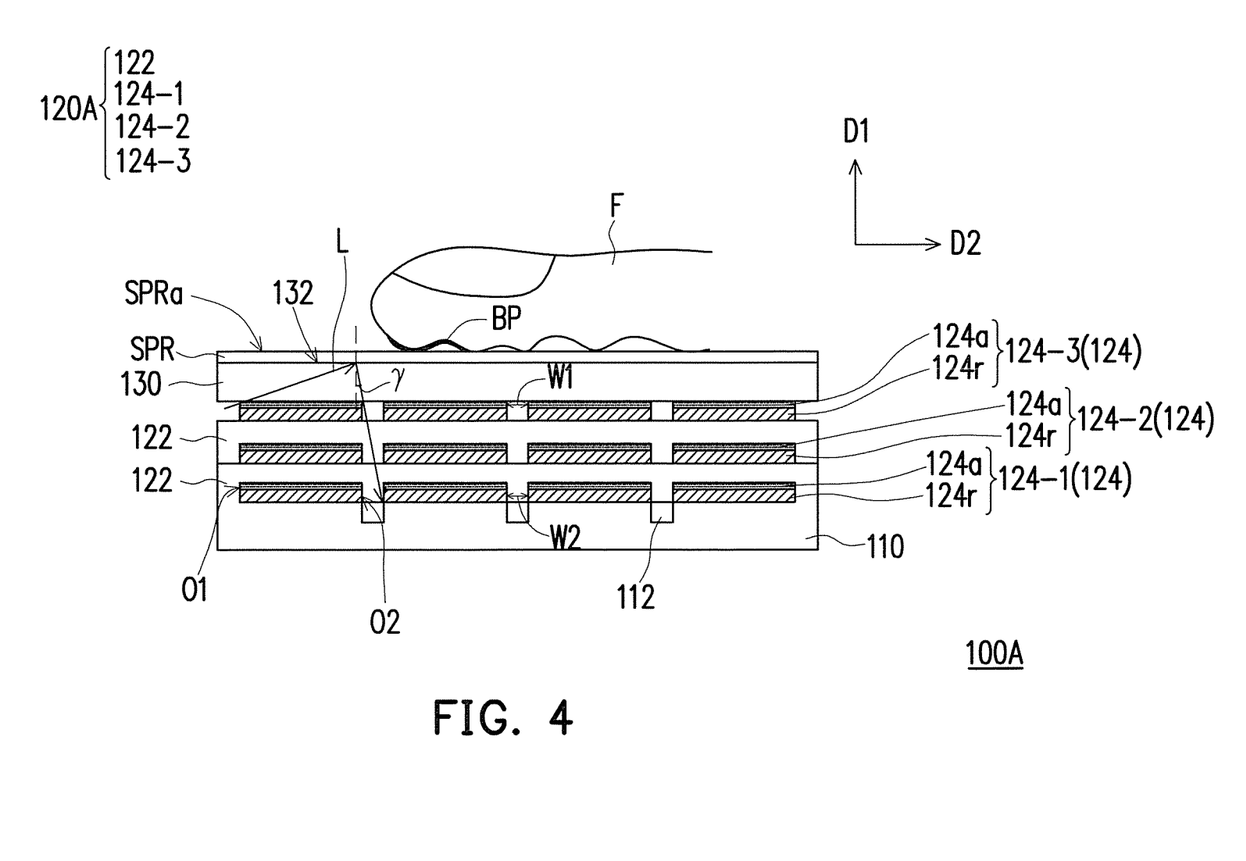
FIG. 4 is a schematic cross-sectional view of an image capture apparatus according to another embodiment of the invention.

FIG. 4 is a schematic cross-sectional view of an image capture apparatus according to another embodiment of the invention. An image capture apparatus 100A of FIG. 4 is similar to the image capture apparatus 100 of FIG. 1, and similar components are not repeated hereinafter. A difference between the two lies in that the width W1 of each first opening O1 is the same as the width W2 of each second opening O2 in a spatial filter 120A of FIG. 4. In this embodiment, for example, the light absorbing layer 124a may be an opaque material, such as graphite or other light absorbing materials. In this embodiment, the light absorbing layer 124a may be formed on a surface of the reflective layer 124r by a coating process, and the light absorbing layer 124a is disposed on the reflective layer 124r in the form of a thin film. However, the invention is not limited thereto.

Figure 5:
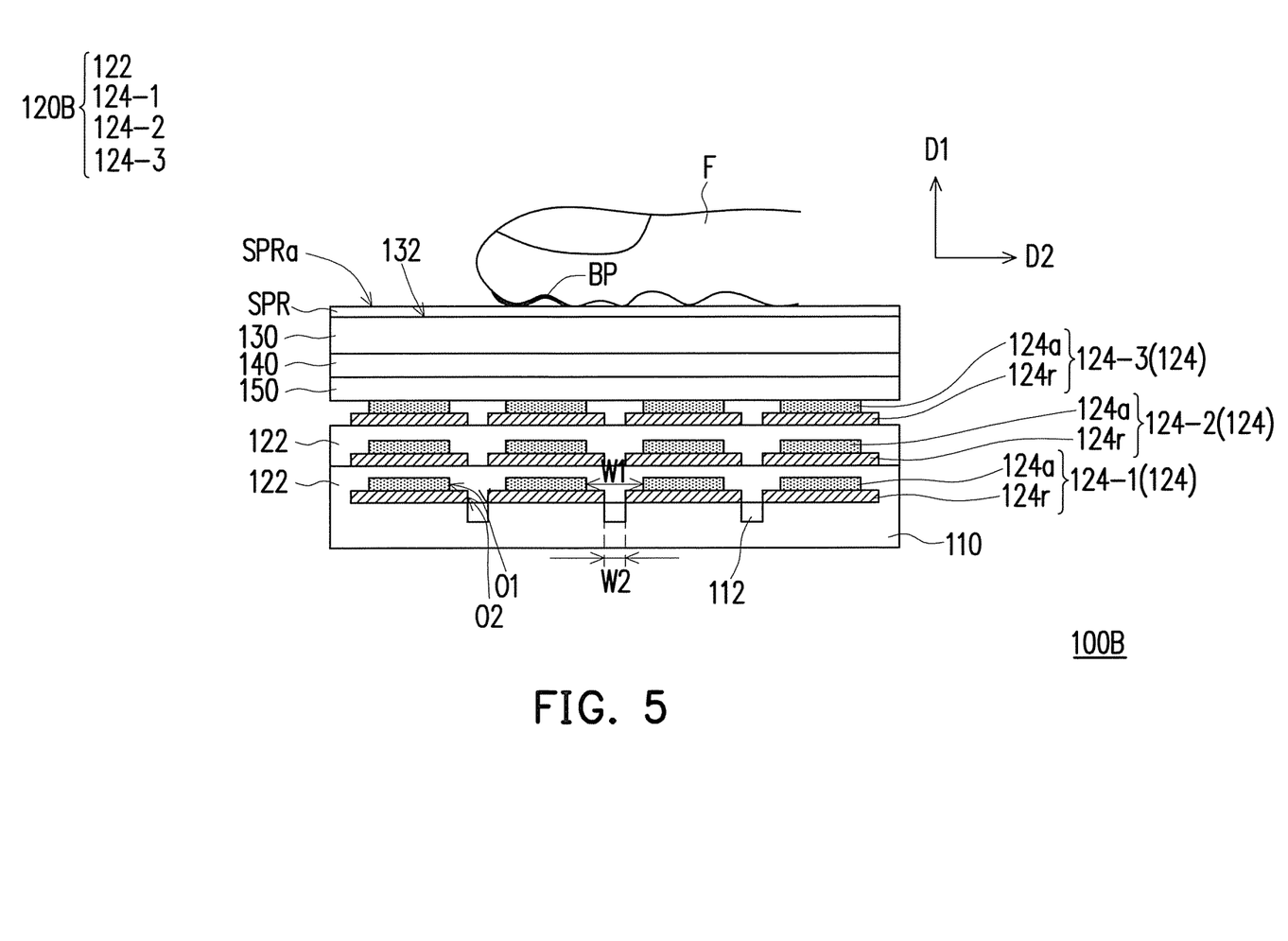
FIG. 5 is a schematic cross-sectional view of an image capture apparatus according to yet another embodiment of the invention.

FIG. 5 is a schematic cross-sectional view of an image capture apparatus according to yet another embodiment of the invention. An image capture apparatus 100B of FIG. 5 is similar to the image capture apparatus 100 of FIG. 1, and a spatial filter 120B is similar to the spatial filter 120 of FIG. 1, and similar components are not repeated hereinafter. In this embodiment, the image capture apparatus 100B may further selectively include a display panel 140, wherein the spatial filter 120B is located between the display panel 140 and the image capture element 110. In this embodiment, the display panel 140 may selectively serve as a light source for illuminating the finger F. However, the invention is not limited thereto. For example, the display panel 140 may be an organic light-emitting diode (OLED) display apparatus or other types of display apparatus. In a feasible embodiment, the light source of the display panel 140 may serve as a light source for the image capture apparatus 100B. In this embodiment, the image capture apparatus 100B may further selectively include a filter layer 150 located on the image capture element 110. In this embodiment, the filter layer 150 is located between a cover plate 130 and the image capture element 110, for example. However, the invention is not limited thereto. The filter layer 150 is adapted to filter out an ambient light with a wavelength outside the wavelength range of the light beam L. For example, if the light beam L is an infrared light beam, the filter layer may be an IR pass filter. If the light beam L is a visible light beam, the filter layer may be an IR cut filter. However, the invention is not limited thereto. According to other embodiments, the filter layer may also be other types of filter layers.

Figure 6:
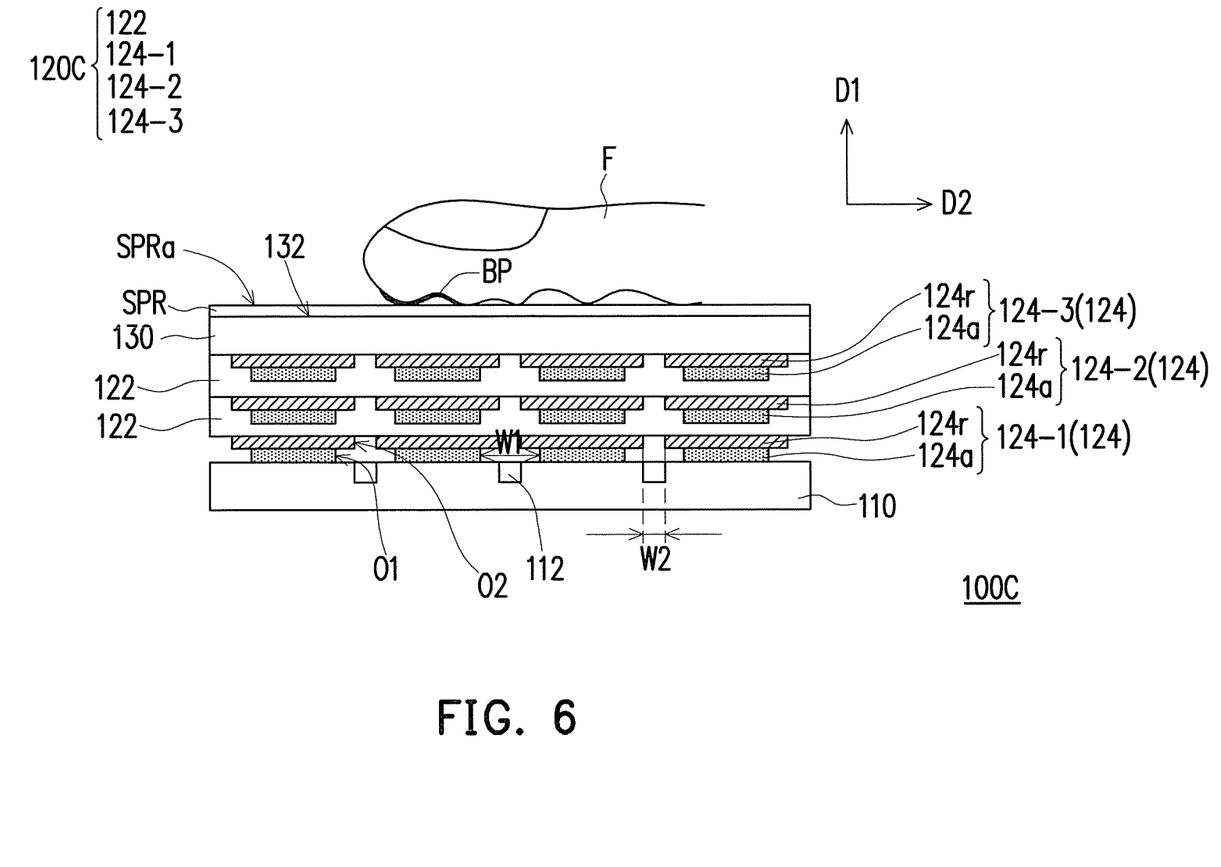
FIG. 6 is a schematic cross-sectional view of an image capture apparatus according to yet another embodiment of the invention.

FIG. 6 is a schematic cross-sectional view of an image capture apparatus according to yet another embodiment of the invention. An image capture apparatus 100C of FIG. 6 is similar to the image capture apparatus 100 of FIG. 1, and similar components are not repeated hereinafter. A difference between the two is as follows: in the spatial filter 120 of FIG. 1, the light absorbing layer 124a of the light shielding structure 124 is disposed on the reflective layer 124r of the same light shielding structure 124; however, in a spatial filter 120C of FIG. 4, the light absorbing layer 124a of the light shielding structure 124 is disposed under the reflective layer 124r of the same light shielding structure 124. The image capture apparatus 100C has similar functions and advantages as those of the image capture apparatus 100 of FIG. 1, and detailed descriptions are not repeated hereinafter.

Figure 7:
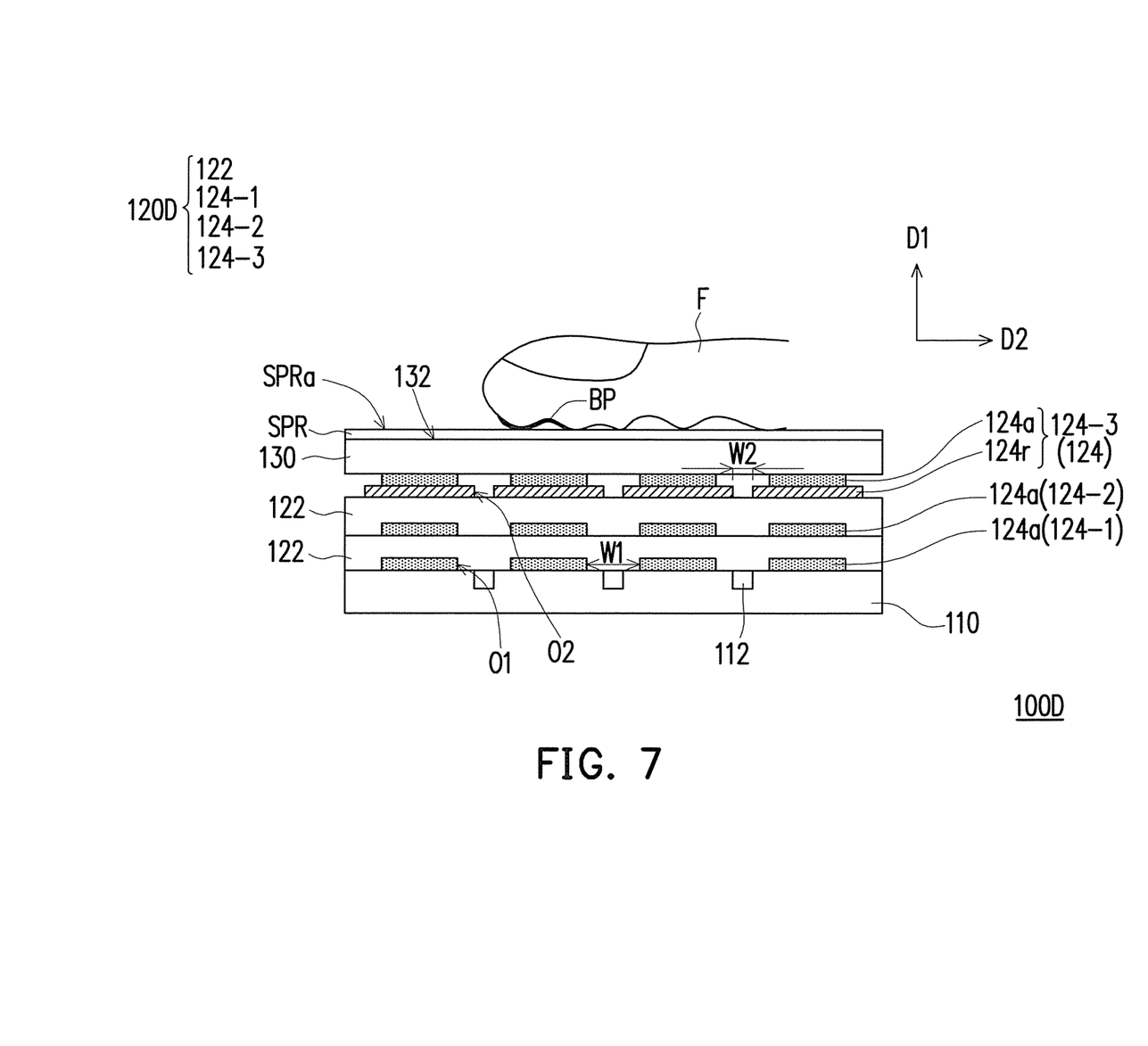
FIG. 7 is a schematic cross-sectional view of an image capture apparatus according to an embodiment of the invention.

FIG. 7 is a schematic cross-sectional view of an image capture apparatus according to an embodiment of the invention. An image capture apparatus 100D of FIG. 7 is similar to the image capture apparatus 100 of FIG. 1, and similar components are not repeated hereinafter. A difference between the two is as follows: a spatial filter 120D of FIG. 7 includes the light shielding structures 124-1, 124-2 and 124-3, wherein the light shielding structures 124-1 and 124-2 are closer to the image capture element 110 than the light shielding structure 124-3 is, and the light shielding structures 124-1 and 124-2 may have no reflective layer. The image capture apparatus 100D has similar functions and advantages as those of the image capture apparatus 100 of FIG. 1, and detailed descriptions are not repeated hereinafter.

Figure 8:
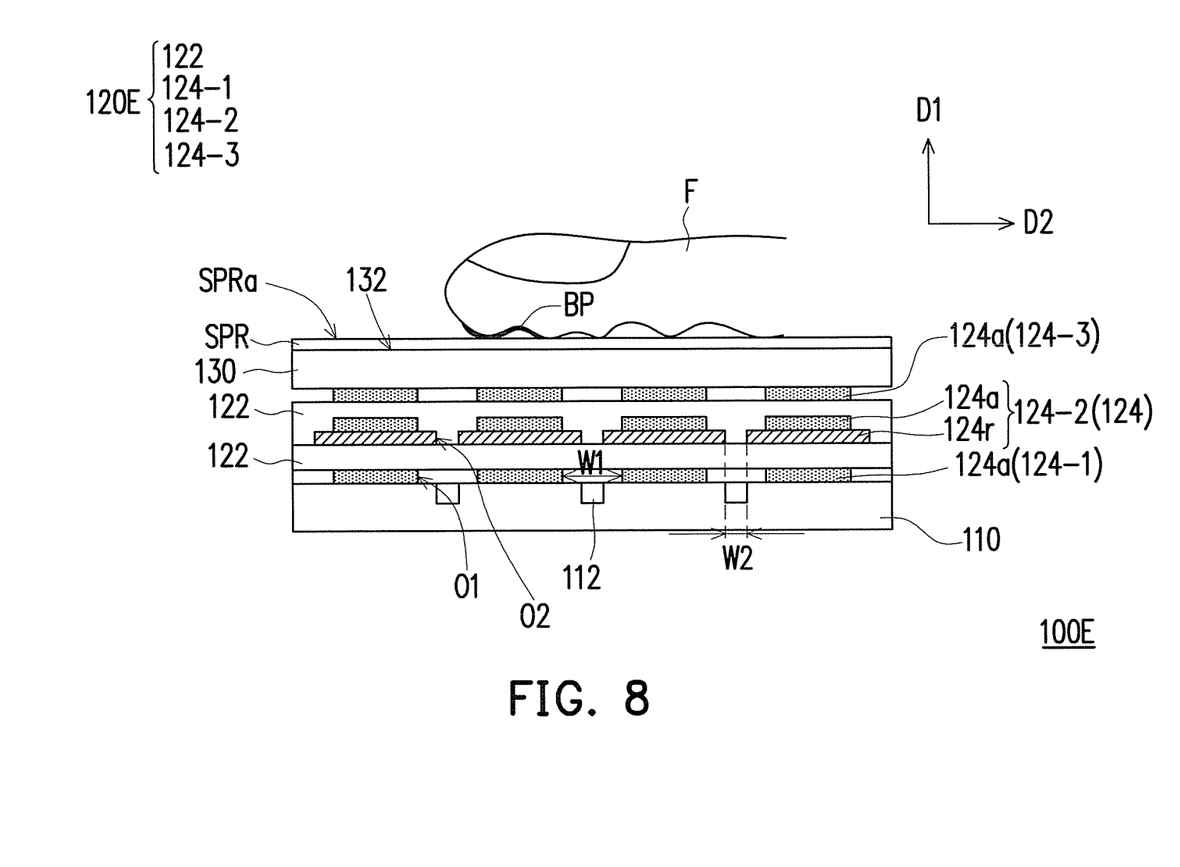
FIG. 8 is a schematic cross-sectional view of an image capture apparatus according to another embodiment of the invention.

FIG. 8 is a schematic cross-sectional view of an image capture apparatus according to another embodiment of the invention. An image capture apparatus 100E of FIG. 8 is similar to the image capture apparatus 100 of FIG. 1, and similar components are not repeated hereinafter. A difference between the two is as follows: a spatial filter 120E of FIG. 8 includes the light shielding structures 124-1, 124-2 and 124-3, wherein the light shielding structure 124-2 is disposed between the plurality of light shielding structures 124-1 and 124-3, and the light shielding structure 124-2 may have no reflective layer. The image capture apparatus 100E has similar functions and advantages as those of the image capture apparatus 100 of FIG. 1, and detailed descriptions are not repeated hereinafter.

Figure 9:
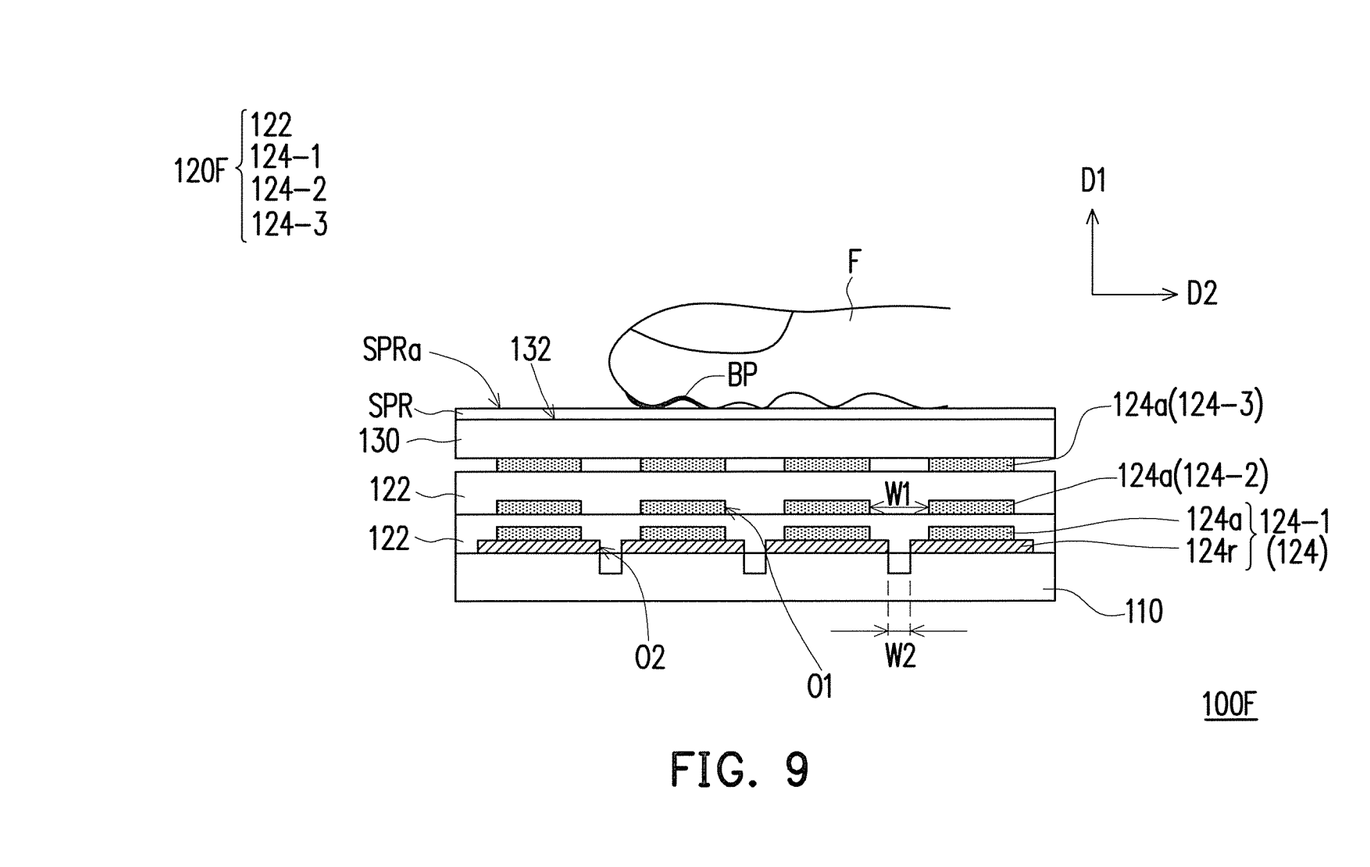
FIG. 9 is a schematic cross-sectional view of an image capture apparatus according to yet another embodiment of the invention.

FIG. 9 is a schematic cross-sectional view of an image capture apparatus according to yet another embodiment of the invention. An image capture apparatus 100F of FIG. 9 is similar to the image capture apparatus 100 of FIG. 1, and similar components are not repeated hereinafter. A difference between the two is as follows: a spatial filter 120F of FIG. 7 includes the light shielding structures 124-1, 124-2 and 124-3, wherein the light shielding structures 124-2 and 124-3 are farther away from the image capture element 110 than the light shielding structure 124-1 is, and the light shielding structures 124-2 and 124-3 may have no light absorbing layer. The image capture apparatus 100F has similar functions and advantages as those of the image capture apparatus 100 of FIG. 1, and detailed descriptions are not repeated hereinafter.

In summary, the image capture apparatus of the invention includes the image capture element and includes the spatial filter disposed on the image capture element. The spatial filter includes the translucent substrates and the light shielding structures that are alternately arranged. Furthermore, the light shielding structure includes the reflective layer and the light absorbing layer that are stacked to each other, the reflective layer has the plurality of second openings, the light absorbing layer has the plurality of first openings, and the width of the plurality of second openings is less than the width of the plurality of first openings. Since the width of the second opening of the reflective layer may be less than the width of the first opening of the light absorbing layer, the light beam reflected by the finger may enter the pixel region on the image capture element in a more collimated manner so as to achieve good image capturing quality. In addition, even if an uncollimated light beam enters the opening so as to contact the surface of the reflective layer, the surrounding light absorbing layer may absorb the light beam immediately, thereby preventing the light beam from entering the adjacent opening to cause a cross-talk phenomenon and thus improving the accuracy of image capturing.

Although the embodiments are already disclosed as above, these embodiments should not be construed as limitations on the scope of the invention. It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:
1. An image capture apparatus, comprising:
   an image capture element having a plurality of pixel regions; and
   a spatial filter disposed on the image capture element, wherein the spatial filter comprises:

a plurality of translucent substrates; and a plurality of light shielding structures, wherein the plurality of light shielding structures and the plurality of translucent substrates are alternately arranged along a first direction, wherein each of the plurality of light shielding structures at least comprises a light absorbing layer, and the light absorbing layer has a plurality of first openings respectively corresponding to the plurality of pixel regions; at least one light shielding structure of the plurality of light shielding structures comprises a reflective layer and a light absorbing layer stacked to each other, the reflective layer has a plurality of second openings respectively overlapped with the plurality of first openings of the light absorbing layer of the at least one light shielding structure, each of the plurality of second openings of the reflective layer has a width W2 in a second direction, and each of the plurality of first openings of the light absorbing layer has a width W1 in the second direction, wherein the width W1 of each of the plurality of first openings and the width W2 of each of the plurality of second openings satisfy $0.2W1 \leq W2 \leq 0.8W1$.

2. The image capture apparatus as recited in claim 1, wherein a sum of a thickness of the light absorbing layer and a thickness of the reflective layer is less than a thickness of the translucent substrate.

3. The image capture apparatus as recited in claim 1, wherein each of the plurality of light shielding structures has the reflective layer and the light absorbing layer stacked to each other.

4. The image capture apparatus as recited in claim 1, wherein the plurality of light shielding structures comprise a first light shielding structure and a second light shielding structure, the first light shielding structure comprises the reflective layer and the light absorbing layer stacked to each other, and the second light shielding structure comprises a light absorbing layer and does not comprise the reflective layer.

5. The image capture apparatus as recited in claim 4, wherein the first light shielding structure is closer to the image capture element than the second light shielding structure is.

6. The image capture apparatus as recited in claim 4, wherein the first light shielding structure is farther away from the image capture element than the second light shielding structure is.

7. The image capture apparatus as recited in claim 1, further comprising:

a cover plate having a pressing surface adapted to be pressed by a finger, wherein the spatial filter is located between the cover plate and the image capture element.

8. The image capture apparatus as recited in claim 1, further comprising:

a display panel, wherein the spatial filter is located between the display panel and the image capture element.

9. The image capture apparatus as recited in claim 1, further comprising:

a filter layer located on the image capture element.

10. The image capture apparatus as recited in claim 1, wherein the reflective layer and the light absorbing layer are contacted.

* * * * *